Figure 3:
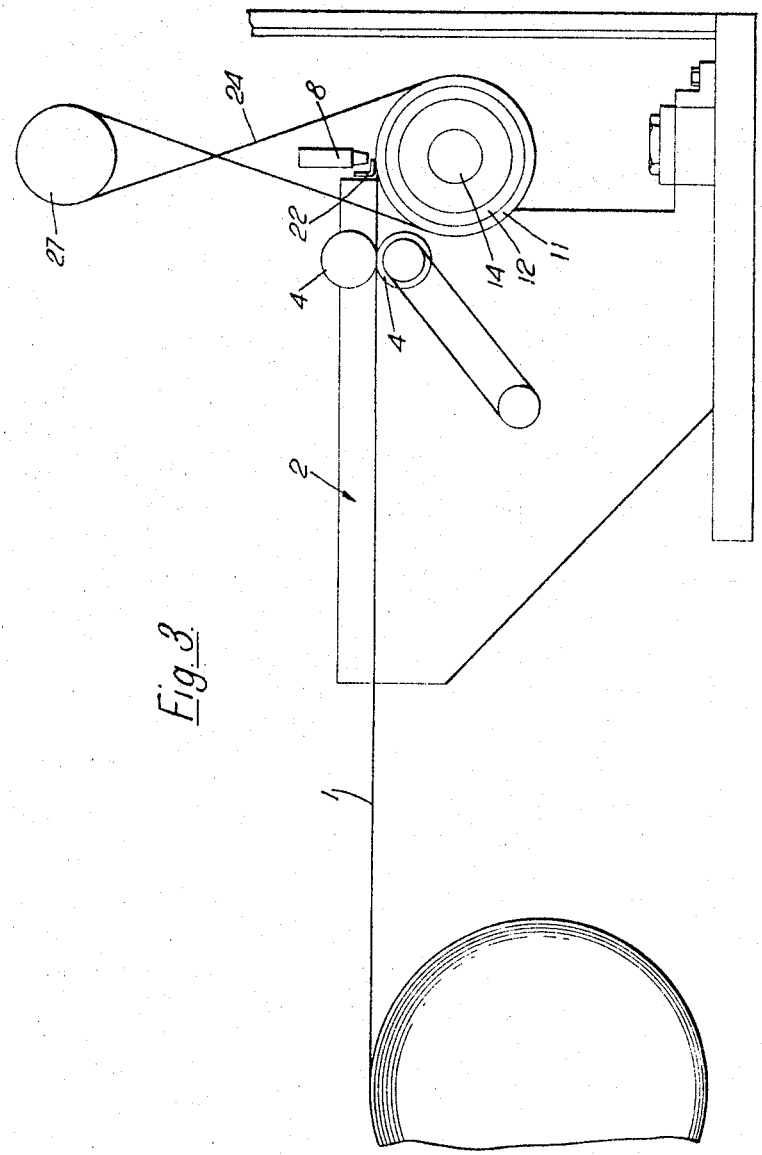

Aug. 30, 1966   J. C. GROVES ETAL   3,269,632
APPARATUS FOR MAKING HELICALLY WOUND PIPES OR TUBES
Filed May 27, 1963   4 Sheets-Sheet 1
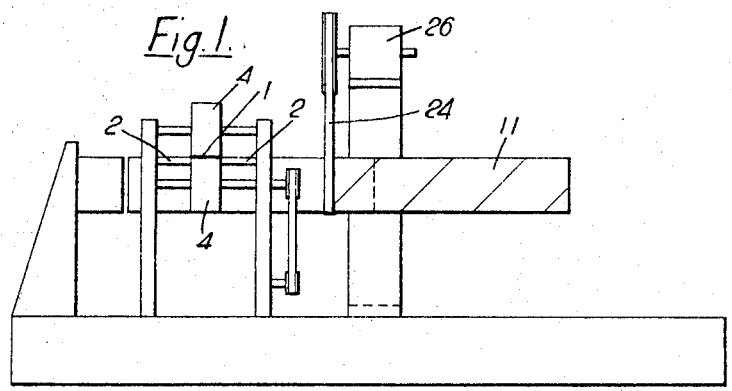
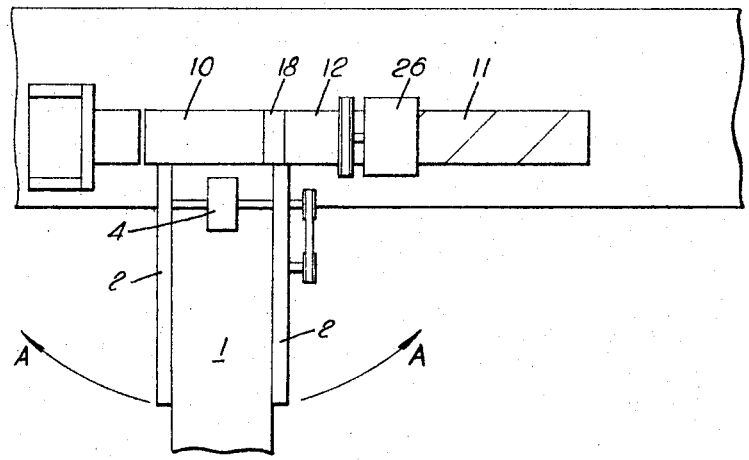

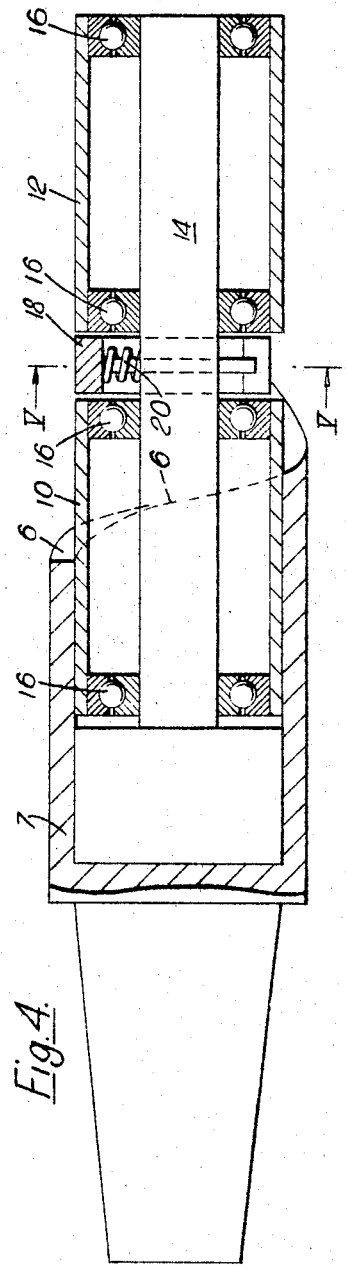
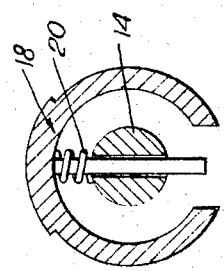

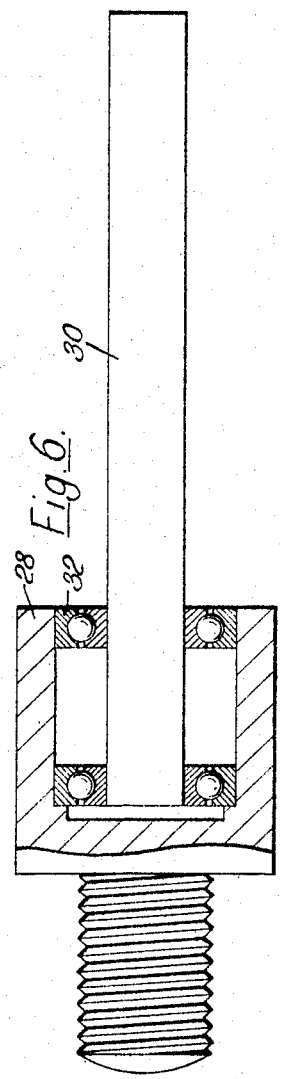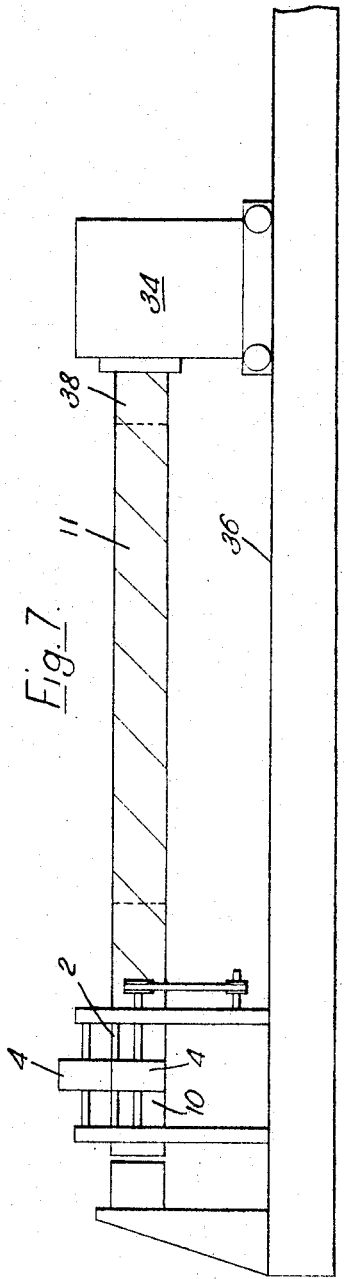

United States Patent Office 3,269,632
Patented August 30, 1966

3,269,632
APPARATUS FOR MAKING HELICALLY WOUND PIPES OR TUBES
John Creed Groves and James Ronald Penrose, Watford, England, and John Humphrey Millar, 6 Chelsea Lodge, Tite St., London SW. 3, England; said Groves and said Penrose assignors to said Millar
Filed May 27, 1963, Ser. No. 283,284
Claims priority, application Great Britain, May 29, 1962, 20,712/62
4 Claims. (Cl. 228—15)

This invention relates to helically welded pipes or tubes formed of strip material.

It has been proposed in the past, to bend fairly thick strip material around a mandrel and to weld successive turns along a helical line to produce a tube or pipe. Problems, however, arise during the continuous manufacture of such tubes if the strip material is very thin, and if it is desired that the helical turns of the strips be butt-welded due to the difficulty in properly holding and aligning the mating edges of successive turns of the strip during welding.

A method of making helically wound strip tubes in accordance with the invention comprises continuously feeding the strip material onto a mandrel, with the trailing edge of the strip contacting a fixed shoulder extending helically around the mandrel for one turn, and continuously welding the leading edge of each turn of the strip to the trailing edge of the previously formed tube at the point where the edge of the unwelded strip meets the edge of the tube.

The machine in accordance with the invention for continuously forming helically welded pipes or tubes of strip material comprises a rotatable mandrel around which the strip is fed, a raised shoulder fixed in position around a portion of the mandrel and extending for one helical turn, welding means positioned to weld the leading edge of the strip to the point where it contacts the trailing edge of the tube (i.e., the trailing edge of the previously welded strip turn) and means, such as a friction belt surrounding the tube or a driven member engaging the outer end of the tube, continuously to rotate the tube in the direction to tighten this, thus holding the strip turns being welded, taut and advancing the tube through the machine. The mandrel may be formed in two sections with a spring-loaded copper shoe or the like between the sections under the welding means, so that the shoe presses against the edges of the strip turns being welded to help to maintain them in alignment or for tube diameters under about 1" the mandrel may comprise a single section which is free to rotate.

It has been found that the combination of keeping the tube taut by means of the feeding means, keeping the two strip turns supported at the point of welding, by for example the copper shoe incorporated in the mandrel, and by maintaining the welding position at the point where the strip edges first meet, enables the helical turns of the tube to be welded together with the edges abutting against each other even when the strips are very thin. For example, a 2" diameter tube may have a strip thickness of from 4 to 10 thousandths of an inch, and for the 6" diameter tubes, or larger, the strip thickness may be from 4 to 20 thousandths of an inch.

The strip, which may, for example, be of stainless steel, Nimonic, titanium, mild steel, or light alloy, may be either flat or preformed laterally to a curvature equal to that of the tube to be formed. In the latter case the strip is substantially prevented from buckling during feeding into the machine, and it more readily assumes the curvature of the tube than flat strip. It is also convenient to have the width of the strip equal to the diameter of the tube to be formed.

The invention will now be described by way of example with reference to the accompanying drawings in which:

FIGURE 1 is a diagram showing in side elevation, the general layout of one embodiment of a machine in accordance with the invention, FIGURE 2 is a plan view corresponding to FIGURE 1, FIGURE 3 is an end elevation corresponding to FIGURE 1, and shown on an enlarged scale, FIGURE 4 is a detailed view of a mandrel for use in the machine shown in FIGURES 1 to 3, FIGURE 5 is a section on the line V—V of FIGURE 4, FIGURE 6 is a detailed view of an alternative form of mandrel, and FIGURE 7 is a diagrammatic view of a further embodiment of a machine in accordance with the invention.

The strip 1 to be formed into a tube, is either flat or preformed laterally and is fed over a guide 2 by means of two or more friction rollers 4, all being positively driven. The guide 2 includes upstanding side flanges and anti-buckle plates above and below the strip. The guide is horizontally adjustable as is indicated by the arrows A in FIGURE 2, so that tubes of varying diameter can be formed of strip having a fixed width depending upon the angle at which the strip is fed.

The strip, after leaving the guide is fed by the rollers 4 onto a rotatable mandrel with its trailing edge in contact with a raised shoulder 6 (see FIGURE 4). The shoulder 6 is formed at the outer end of a fixed portion 7 of the mandrel and extends for one helical turn around the inner end of the mandrel and guides the strip so that it is formed into a succession of helical turns. As the leading edge of the strip meets the trailing edge of the previously formed tube it is welded to the edge in a butt joint by means of an argon arc torch 8 (see FIGURE 3). The point of welding is arranged as near as possible to the point at which the leading edge of the strip 1 entering the machine first meets the trailing edge of the previously formed tube. The argon arc welding is carried out using shielded tungsten electrodes with additional argon supplied internally to protect the under weld from oxidization. Also an external argon diffuser shield shaped to follow the welded helix is provided to keep the weld in good condition by preventing external oxidization.

The mandrel shown in FIGURE 4, has two rotatable portions 10 and 12 mounted on a fixed inner support 14 extending out from within the fixed portion 7, through ball recess 16. A copper shoe 18 is mounted in the gap between the two rotatable portions 10 and 12 of the mandrel, and is biased radially outwardly by a spring 20. The point of welding is arranged to be immediately above the copper shoe 18, and this shoe has the effect of holding the edges of the strip together in alignment during the welding operation. A spring foot 22 (see FIGURE 3) is mounted above the shoe 18 to hold the strip down onto the mandrel, on each side of the welding torch.

The tube 11 is fed forwardly, but at the same time held taut, by means of an endless rubber lined belt 24, which is wrapped around the tube as can be seen in FIGURE 3, and which is driven by a variable speed motor 26. The belt is driven through one or more pulleys 27 which are set at an angle to the axis of the tube so as to cause the tube to revolve and also move horizontally along the second rotating portion 12 of the mandrel due to its helical contact with the tube. The amount by which the tube is fed forward by each rotation of the belt is adjustable, by altering the angle of the driving pulley 27. The belt is guided by edge rollers (not shown) to keep it in position, and to prevent it moving sideways with the tube, and is driven at a speed such that it is always slipping slightly around the tube to keep the tube taut and wound tightly onto the mandrel.

The second portion 12 of the mandrel is made slightly smaller in diameter than the first portion 10 to allow for any contraction in diameter of the welded tube and, at the same time, prevent any undue displacement by the tension in the belt.

The strip is guided on its trailing edge by the fixed helical guide 6, for one complete turn, and until the guiding is, in effect, taken over by the leading edge of the succeeding turn just prior to the welding position, i.e., the point at which the incoming strip first meets the trailing edge of the formed helix or tube.

The belt not only feeds the tube forwardly, but also ensures that the strip is kept taut whilst welding takes place as the belt, in effect, "winds the tube up" as it rotates.

The mandrel as shown in FIGURES 1 to 4 of the drawings having two rotatable portions is chiefly suitable for tubes having a diameter of 1" and above. For sides under 1" diameter the mandrel shown in FIGURE 6 is preferably used. This mandrel includes a fixed portion 28 having a raised shoulder (not shown) similar to the shoulder 6 of the mandrel shown in FIGURE 4, extending for one helical turn. The mandrel comprises a freely revolving solid copper (or the like) portion 30 rotatably mounted in the head 28 through bearings 32. The strip is fed forwardly onto the copper rod 38 which if the mandrel is incorporated in the machine shown in FIGURES 1 to 3, has a length equal to the combined lengths of the portions 10, 12 of the mandrel shown in FIGURE 4.

In the machine shown in FIGURE 7, the belt drive 24 is replaced by a device including a tractor 34 running on tracks 36 along the base of the machine. The tractor incorporates a rotary drive for an outwardly extending spigot 38 engaging in the outer end of the tube 11. The speeds of the strip feed, rotating spigot 38 and tractor movement along tracks 36 are synchronized so that the tube 11 is mounted taut and "wound up" as it moves through the machine. Also the strip is accurately positioned and tensioned for welding.

The machine, which in either method described operates continuously, can produce a welded tube very quickly, the speed only being limited by the speed at which the weld can be made. A speed of 4 feet per minute of the weld is easily obtainable.

The machine may incorporate means (not shown) to preform the strip, before it engages the mandrel, so as to give it a lateral curvature of a radius equal to that of the tube to be formed.

The mandrel on the machine is removable so that mandrels of differing diameters can be introduced as desired so that the machine can produce tubes of differing diameters depending upon the diameter of the mandrel used.

I claim:
1. A machine for forming helically welded pipes or tubes of strip material comprising a mandrel having a rotatable portion around which the strip is fed, a raised shoulder fixed in position around a portion of the mandrel and extending for one helical turn, welding means positioned to butt-weld the leading edge of the strip to a previously formed tube at the point where it contacts the trailing edge of the tube, and drive means continuously to rotate the tube in the direction to tend to cause the helical turns to tighten and to advance the tube through the machine; said drive means comprising a friction belt surrounding the tube and a driving pulley for the belt, the angle between the pulley axis and the tube axis being adjustable so that the amount by which the tube is fed forward for each rotation of the belt can be altered.

2. A machine for forming helically welded pipes or tubes of strip material comprising a mandrel having a rotatable portion around which the strip is fed, a raised shoulder fixed in position around a portion of the mandrel and extending for one helical turn, welding means positioned to butt-weld the leading edge of the strip to a previously formed tube at the point where it contacts the trailing edge of the tube, and drive means continuously to rotate the tube in the direction to tend to cause the helical turns to tighten and to advance the tube through the machine; said drive means comprising a tractor running on rails and including a driven means engaging the outer end of the tube so as to rotate the tube and to drag it through the machine.

3. A machine for forming helically welded pipes or tubes of strip material comprising a mandrel having a rotatable portion around which the strip is fed, a raised shoulder fixed in position around a portion of the mandrel and extending for one helical turn, welding means positioned to butt-weld the leading edge of the strip to a previously formed tube at the point where it contacts the trailing edge of the tube, and drive means continuously to rotate the tube in the direction to tend to cause the helical turns to tighten and to advance the tube through the machine, the rotatable portion of the mandrel being formed of an outer rotatable portion and an inner rotatable portion, a shoe being positioned between the outer and inner portions, said shoe being biased outwardly immediately below the welding means.

4. A machine as claimed in claim 3 in which the diameter of the relatively outer rotatable portion of the mandrel is slightly smaller than the diameter of the relatively inner rotatable portion.

References Cited by the Examiner
UNITED STATES PATENTS

| | | | |
|---|---|---|---|
| 1,018,291 | 2/1912 | Beadle | 219—62 |
| 1,923,284 | 8/1933 | Taylor et al. | 219—62 |
| 2,873,353 | 2/1959 | Rudd | 219—62 |
| 3,046,382 | 7/1962 | Morris | 219—62 |

JOHN F. CAMPBELL, *Primary Examiner.*

WHITMORE A. WILTZ, *Examiner.*

M. L. FAIGUS, *Assistant Examiner.*